United States Patent [19]
Kanao

[11] Patent Number: 5,507,319
[45] Date of Patent: Apr. 16, 1996

[54] SYNTHETIC RESIN BELLOWS PIPE

[76] Inventor: Shiro Kanao, 9-18, Nanpeidai 4-Chrome, Takatsuki, Osaka, Japan

[21] Appl. No.: 365,159

[22] Filed: Dec. 28, 1994

[30] Foreign Application Priority Data

Dec. 28, 1993 [JP] Japan .................................. 5-353955

[51] Int. Cl.$^6$ .................................................. F16L 11/12
[52] U.S. Cl. .......................... 138/110; 138/116; 138/121; 138/141; 138/148
[58] Field of Search ................................... 138/116, 114, 138/121, 119, 137, 141, 148, 110

[56] References Cited

U.S. PATENT DOCUMENTS

| | | | |
|---|---|---|---|
| 3,090,403 | 5/1963 | Kroekel | 138/121 |
| 3,201,861 | 8/1965 | Fromson et al. | 138/114 |
| 4,081,190 | 3/1978 | Itzler | 138/121 |
| 4,415,764 | 11/1983 | Priaroggia et al. | 138/110 |
| 4,424,834 | 11/1984 | Sumi et al. | 138/121 |
| 4,773,458 | 9/1988 | Touzani | 138/121 |
| 4,852,564 | 8/1989 | Sheridan et al. | 138/121 |
| 4,921,147 | 5/1990 | Poirier | 138/121 |
| 5,311,753 | 5/1994 | Kanao | 138/121 |

FOREIGN PATENT DOCUMENTS

51486  1/1993  Japan .

*Primary Examiner*—Timothy F. Simone
*Assistant Examiner*—James F. Hook
*Attorney, Agent, or Firm*—Sughrue, Mion, Zinn, Macpeak & Seas

[57] ABSTRACT

The section of a main pipe wall made of synthetic resin material is formed to be substantially triangular and one inclined wall approaches the other inclined wall while the inclined wall goes over a center line passing through a top of both the inclined walls forming the main pipe wall and the approaching posture is capable of being maintained by itself. A second pipe wall, the wall thickness of which is smaller than that of the main pipe wall, is integrally connected with the inside of the pipe main wall, the section of the second pipe wall is substantially triangular, a bottom of the second pipe wall and predetermined portions of both the inclined walls at the bottom side adhere to a bottom of the main pipe wall and both the inclined walls, and a small space is formed between a top of the second pipe wall and the top of the main pipe wall.

5 Claims, 6 Drawing Sheets

SYNTHETIC RESIN BELLOWS PIPE

BACKGROUND OF THE INVENTION

The present invention relates to a bellows pipe made of synthetic resin, which is suitably used mainly for a drain pipe of a domestic washing machine and an air blowing pipe of a drier for drying futon mats.

Conventionally, a large number of bellows pipes of this type have been proposed and well known, in which the section of the pipe wall is formed to be substantially triangular, and one inclined wall can be made to be approximately parallel with the other inclined wall so that the bellows pipe can take a shortened posture, and this shortened posture can be maintained by itself. For example, there is provided a bellows pipe, the thickness of which is small, that is, the thickness is about 1 mm or less, and the diameter of which is 30 to 40 mm. This bellows pipe is already applied to an air blowing pipe of a futon mat drier for domestic use. The present applicant has made an application for patent of this type bellows pipe used for a drain pipe of a domestic washing machine. The example is shown in Japanese Unexamined Utility Model Publication No. Hei. 5-1486.

Although a large number of bellows pipes of this type have been proposed, the wall thickness is small as described above, and the pipe wall is in a single structure. Therefore, during usage of the bellows pipe over a long period of time, a top portion of the pipe wall wears away or when the bellows pipe is hooked by some other objects, it is damaged. Thus, in the case of a drain pipe of a washing machine, an unforeseen leak of water occurs, and in the case of a futon mat drier, the capacity is accidentally lowered.

SUMMARY OF THE INVENTION

It is an object of the present invention to provide a pipe which is capable of preventing the occurrence of an accident, which tends to occur in the conventional synthetic resin bellows pipe, and further the durability of which is high. That is, the present invention is to provide a bellows pipe constructed in such a manner that the shortened posture is maintained, and the weight and the quantity of used material are not greatly increased.

The present invention provides a synthetic resin bellows pipe in which the section of a first pipe wall made of synthetic resin material is formed to be substantially triangular and one inclined wall approaches the other inclined wall while the inclined wall goes over a center line passing through a top of both the inclined walls forming the first pipe wall and the approaching posture is capable of being maintained by itself, characterized in that: a second pipe wall, the wall thickness of which is smaller than that of the first pipe wall, is integrally connected with the inside of the first pipe wall; the section of the second pipe wall is substantially triangular; a bottom of the second pipe wall and predetermined portions of both the inclined walls of the second pipe wall at the bottom side adhere to a bottom of the first pipe wall and both the inclined walls; and a small space is formed between a top of the second pipe wall and the top of the first pipe wall.

In this case, the length of an adhesive portion at the bottom side in which both the inclined walls of the first pipe wall (main pipe wall) adhere onto both the inclined walls of the second pipe wall 11, is preferably in a range from one half to nine tenths of the length of both the inclined walls of the first pipe wall. Both the first and second pipe walls may be adhered to each other by means of fusion or adhesion, and appropriate means may be adopted. The wall thickness of the main pipe wall may be appropriately determined in accordance with the object of the use of the pipe. The wall thickness of the second wall may be appropriately determined so that the main pipe wall can be smoothly changed between the extended and shortened postures and further the extended and shortened postures can be maintained by the pipe itself. In this case, it is necessary that the wall thickness of the second pipe wall is smaller than that of the main pipe wall.

When a general classification is made with respect to the means for manufacturing the synthetic resin bellows pipe described above, the following two methods are provided. One is a method In which both materials for forming the main (first) pipe wall and the second pipe wall are made to be a pipe-shape, and then a pipe provided with annular corrugation or spiral corrugation is formed by means of blow formation or vacuum formation, or by means in which the blow formation and vacuum formation are combined. The other is a method in which a belt-shaped material is spirally wound, and side edges are overlapped and adhered so that a pipe provided with spiral corrugation can be formed. The pipe of the present invention can be manufactured by any of the means described above. According to the latter method, the top, bottom or a portion close to the top or bottom can be easily made to be thin. Accordingly, this thin portion can be made to be an oscillating fulcrum at which the pipe wall is bent in the case of a change between the extended and shortened postures.

The synthetic resin bellows pipe of the present invention is constructed in the manner described above. Therefore, when the pipe is stored or transported, the pipe is pushed and compressed in the axial direction, and the inclined walls on one side are moved toward the inclined walls on the other side, so that the inclined walls goes over the center line which passes through the top portion of the pipe wall. In this way, the pipe is put into a condition in which the pipe length is shortened. When the pipe is placed into this shortened condition, even if the pushing force is released, the pipe is maintained in the shortened condition. The pipe is stored and transported as described above. When the pipe is used after the transportation, both ends or one end of the pipe is temporarily held and the pipe is pulled in the axial direction, so that the inclined walls on one side are separated from the inclined walls on the other side, wherein the inclined walls go over the center line. In this way, the inclined walls are returned to the initial extended positions so that the inclination angles of the inclined walls on one side can be different from those of the inclination walls on the other side. When the pipe is once put into the extended condition, even if the tension force is released, the pipe is maintained in this extended condition.

The pipe that has been put into the extended condition may be used in the same manner as that of a conventional pipe. Also, it is possible to use the pipe in such a manner that one portion of the pipe wall is put into the shortened condition and the other portion is put into the extended condition. When necessary, a bending force may be applied to the pipe, so that the small diameter side is put into the shortened condition and the large diameter side is put into the extended condition. In this way, the pipe may be used in a bent condition.

As described above, in the case of transportation, the length of the synthetic resin bellows pipe of the present invention is capable of being reduced at least to a half of the length of the pipe in the extended condition. Accordingly, the storage and transportation expenses can be greatly reduced. Further, even when the main pipe wall is damaged by abrasion or other accidents, the leak of fluid from the inside to the outside of the pipe can be stopped by the second pipe wall. Therefore, the pipe can be successively used without any problems. Since the space S is formed between the top portion of the main pipe wall and the top portion of the second pipe wall, there is no possibility that the second pipe wall is damaged simultaneously with the main pipe wall. Even if, the main pipe wall is damaged, the second pipe wall is still protected by the main pipe wall. Therefore, it is possible that the pipe is used over a long period of time, and the durable length of time can be greatly enhanced.

DETAILED DESCRIPTION OF THE PREFERRED EMBODIMENTS

With reference to the accompanying drawings, preferred embodiments of the present invention will be described.

Figure 1:
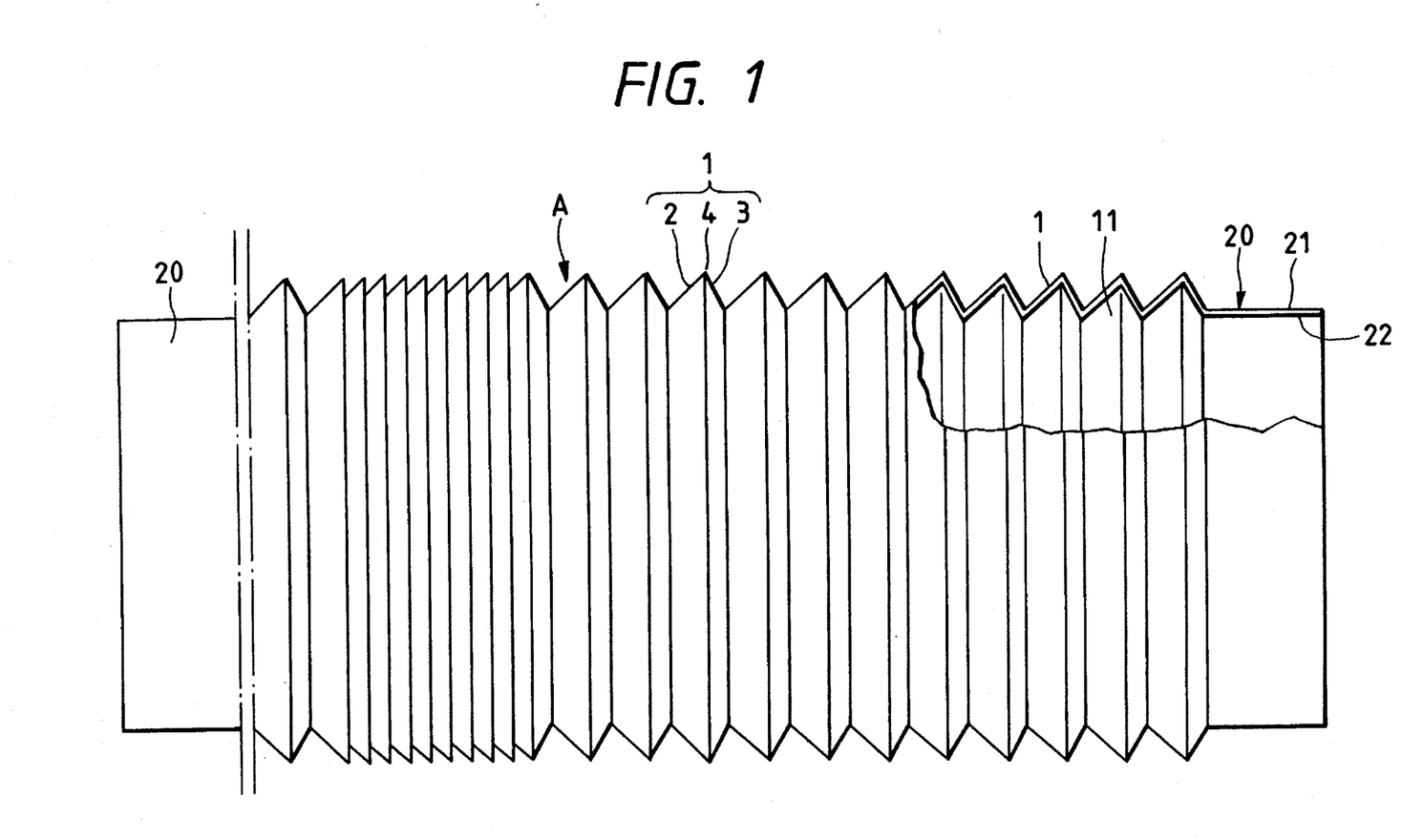
FIG. 1 is a partially exploded front view of the pipe of a first embodiment.
Figure 2A:
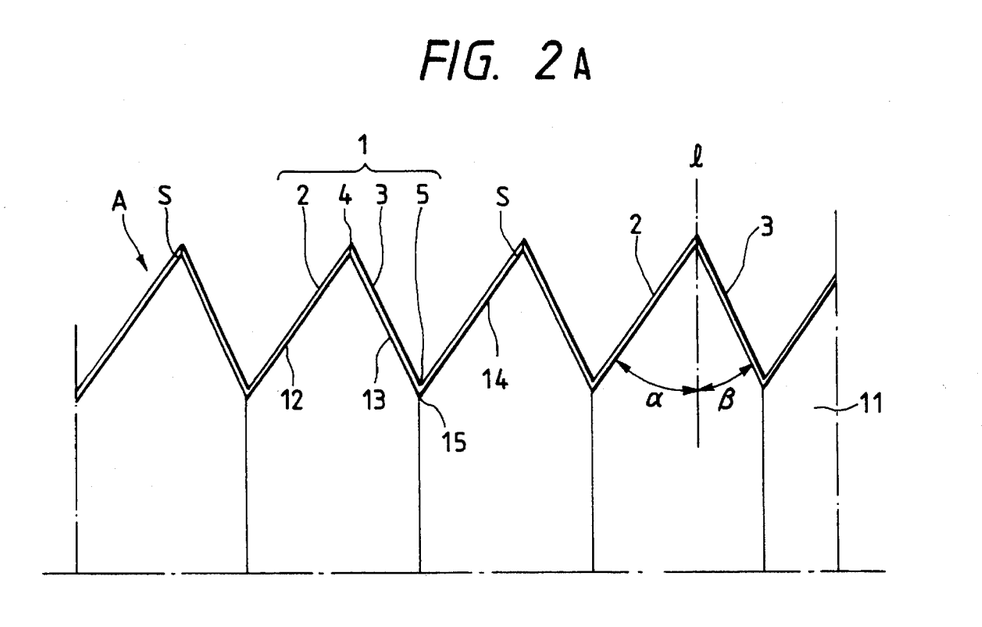
FIG. 2A is a sectional view of the extended posture of the pipe walls of the first embodiment.
Figure 2B:
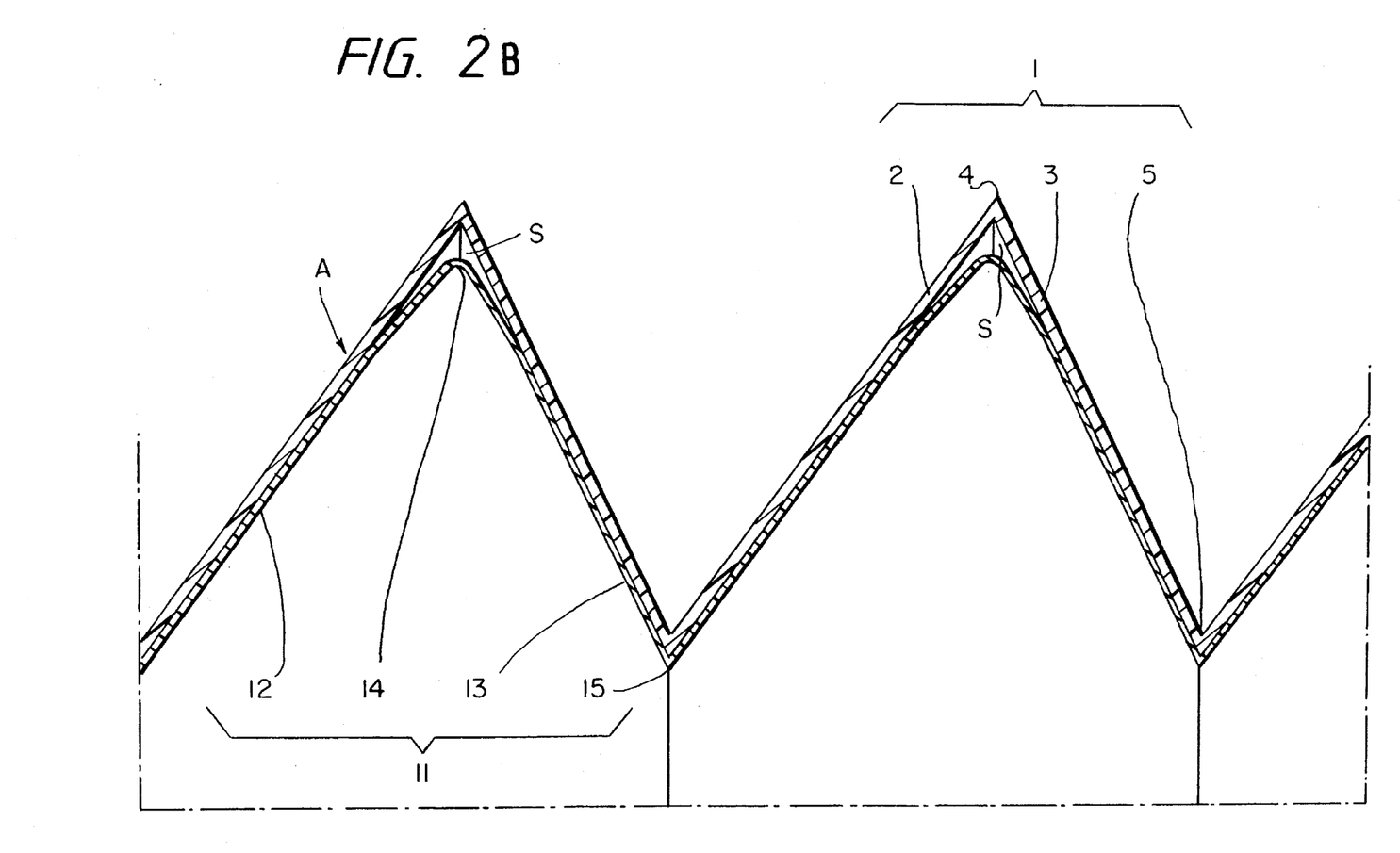
FIG. 2B is an enlarged view of a portion of the two pipe walls of FIG. 2A.
Figure 3:
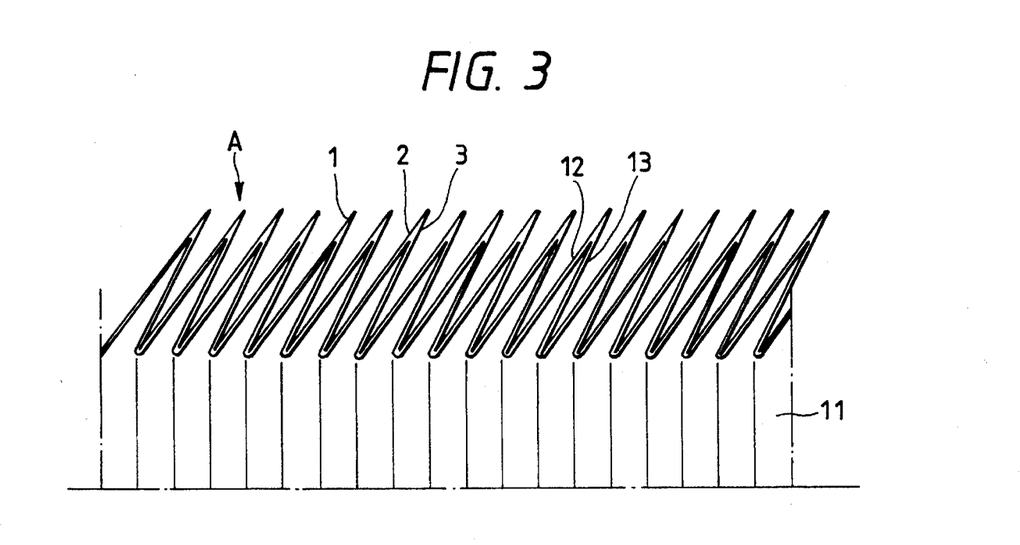
FIG. 3 is a sectional view of the shortened posture of the pipe walls of the first embodiment.

FIGS. 1 to 3 are views showing a pipe according to a first embodiment of the present invention. FIG. 1 is a partially exploded overall arrangement view of the pipe suitable for use as drain pipe A of an electric washing machine, the section of the pipe wall 1 of which is triangular. FIG. 2A is a view showing the extended posture of the pipe, FIG. 2B is an enlarged view of a portion of the two pipe walls, and FIG. 3 is a view showing the shortened posture of the pipe.

The synthetic bellows pipe A of this embodiment is made of polypropylene (PP). As illustrated in FIG. 2A, the section of the main pipe wall 1 is constructed in the following manner. Concerning inclined walls 2 and 3 adjacent to each other, the length of one inclined wall 2 is a little longer than that of the other inclined wall 3, and the inclination angle of the inclined wall 2 is gentler than that of the inclined wall 3. In this way, the inclined walls 2 and 3 are formed to be triangular. As shown in FIG. 3, one inclined wall 3 moves 20 toward the other inclined wall 2 while the inclined wall 3 goes over the center line 1 which passes through a top portion 4, so that the inclined wall 3 approaches the inclined wall 2. This approaching posture is capable of being maintained by the pipe wall itself. The average wall thickness of the inclination wall is approximately 1 mm. Inside the main pipe wall 1, there is provided a second pipe wall 11, the average wall thickness of which is approximately 0.5 mm which is thinner than the main pipe wall 1, wherein the second pipe wall 11 is also made of polypropylene (PP) and the section is formed to be triangular. A bottom 15 and portions of both inclined walls 12 and 13 at the bottom side, the lengths of the portions are approximately two thirds of the inclined walls 12 and 13, are fused with the bottom 5 and both the inclined walls 2 and 3, and a portion located at the top side with respect to this fusing portion is maintained in a non-adhesive condition. Further, as best seen in FIG. 2B a small space S is formed between the top 14 of the second pipe wall 11 and the top 4 of the main pipe wall 1.

The thus obtained pipe A is constructed in the following manner. Sections of both the main pipe wall 1 and the second pipe wall 11 are substantially triangular, and both the inclined walls 2 and 3 composing the main pipe wall 1 are connected with each other and formed into a V-shape at the top 4 and the bottom 5, and the inclined walls 2 and 3 are bent and swung at the fulcrums of the top 4 and bottom 5. As illustrated in FIG. 2, the opening angle α of the inclined wall 2 located on the left with respect to the center line 1 passing through the top 4 in the circumferential direction in FIG. 2 is formed to be a little larger than the opening angle β of the inclined wall 3 located on the right in FIG. 2A. The length of one inclined wall 2 is constructed to be a little longer than the length of the other inclined wall 3. When an external force is applied in the axial direction of the pipe A, the other inclined wall 3 goes over the center line 1 which passes through the top 4, and approaches one inclined wall 2, and this approaching posture is maintained by the pipe wall itself as illustrated in FIG. 3.

In this connection, the pipe A shown in this embodiment is constructed so that it can be applied to a drain pipe of an electric washing machine. Accordingly, as illustrated in FIG. 1, cylindrical portions 20 are integrally provided at both ends of the pipe body. Also in these cylindrical portions, the second pipe wall 22 is fused onto the inside of the main pipe wall 21. The pipe A constructed in the above manner is pushed and compressed in the axial direction so that it can be put into the shortened posture when it is stored or transported. When the pipe A is assembled to a washing machine, this shortened posture is maintained, and when the washing machine is used, an outer end of the pipe is held and extended outside of the washing machine (in the axial direction), so that the length of the pipe is returned to a required value, and the pipe can be used under the condition that the length is maintained long.

Figure 4:
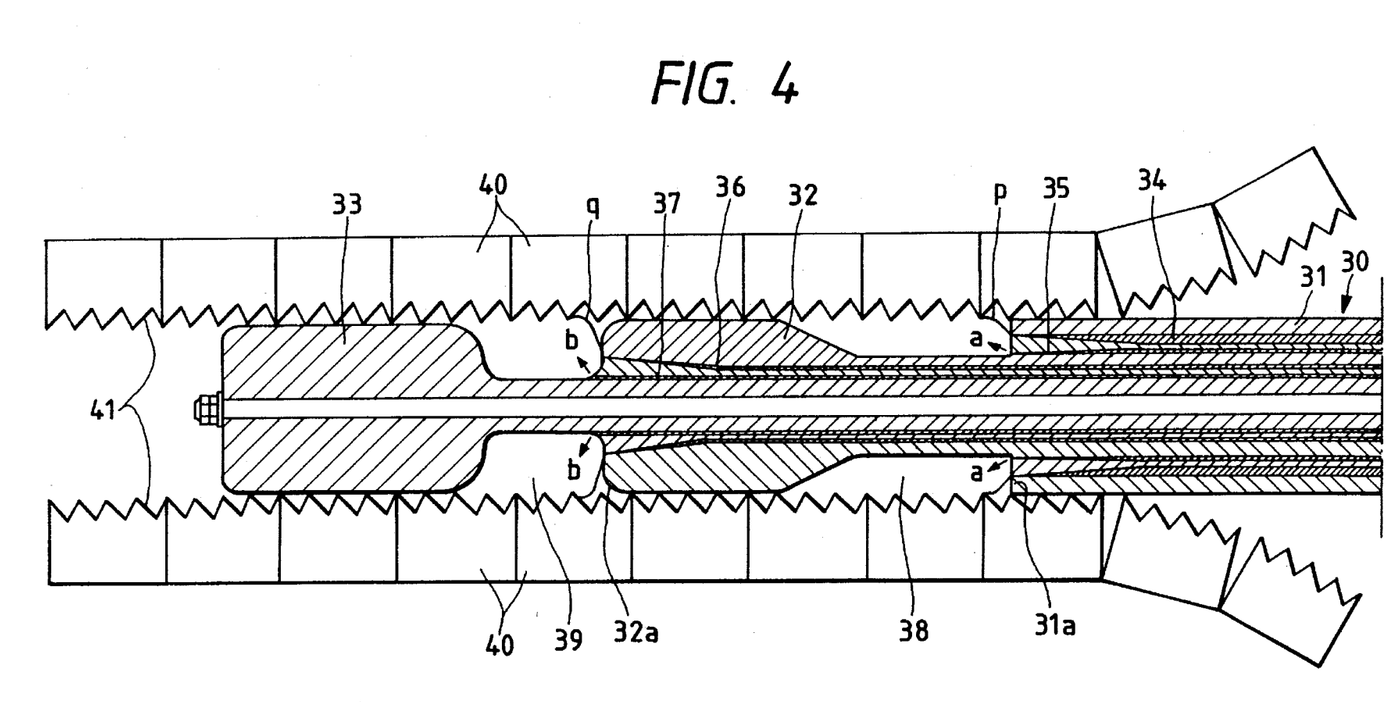
FIG. 4 is a sectional view showing the primary portion of a manufacturing apparatus.

FIG. 4 is a schematic illustration of the manufacturing apparatus in which a means for manufacturing the pipe A is shown. In this drawing, reference numerals are represented by thirties and forties. The basic type of this apparatus is generally known as a caterpillar type blow molding machine. The apparatus of this example is composed in the following manner. A cylindrical nozzle 30 is protruded from the fore end side of a synthetic resin extruder (not shown in the drawing). A first nozzle 31, second nozzle 32 and cooling cylinder 33 are arranged from the base end side in this order, and a large number of metallic blocks 40 connected with each other in a caterpillar-shape are arranged around the aforementioned units so that the units are surrounded by the metallic blocks 40. On the inner circumferential surfaces of these metallic blocks 40, there are provided triangular-groove-shaped annular molds 41 formed to be a corrugation. In the first nozzle 31, there are provided a first material passage 34, first compressed gas passage 35, second material passage 36 and second compressed gas passage 37 from the outer to the inner circumferential side, wherein these units are formed to pass through in the axial direction. Between the first and second nozzles 31 and 32, there is provided a first space 38, and between the second nozzle 32 and the cooling cylinder 33, there is provided a second space 39. The first material passage 34 and the first compressed gas passage 35 are open to the first space 38, and the second material passage 36 and the second compressed gas passage 37 are open to the second space 39.

Material "p" composing the main pipe wall 1 passes through the first material passage 34 and is extruded in a tube-shape from an end face 31a of the first nozzle 31 to the first space 38. Then material "p" is expanded along the metallic mold surface of the metallic mold block 40 by the pressure of gas "a" passing through the first compressed gas passage 35 and injected into the first space 38. Then material "p" successively moves from the first space 38 to the second nozzle 32 side. Next, material "q" composing the second pipe wall 11 passes through the second material passage 36 and is extruded in a tube-shape from an end face 32a of the second nozzle 32 to the second space 39. Then material "q" is expanded toward the inner surface side of the main pipe wall 1 formed on the metallic mold surface by the pressure of gas "b" passing through the second compressed gas passage 37 and injected into the second space 39. In this way, the material "q" at the bottom 5 of the main pipe wall 1 and the portion close to the bottom 5 are contacted with the main pipe wall 1 and fused. At this time, by adjusting the pressure of injected gas "b", the entire face of material "q" on the outer circumference side separate from the bottom 15 is adjusted so that it is not contacted with the first pipe wall 1. In this way, the pipe A explained in the first embodiment can be manufactured.

Figure 5A:
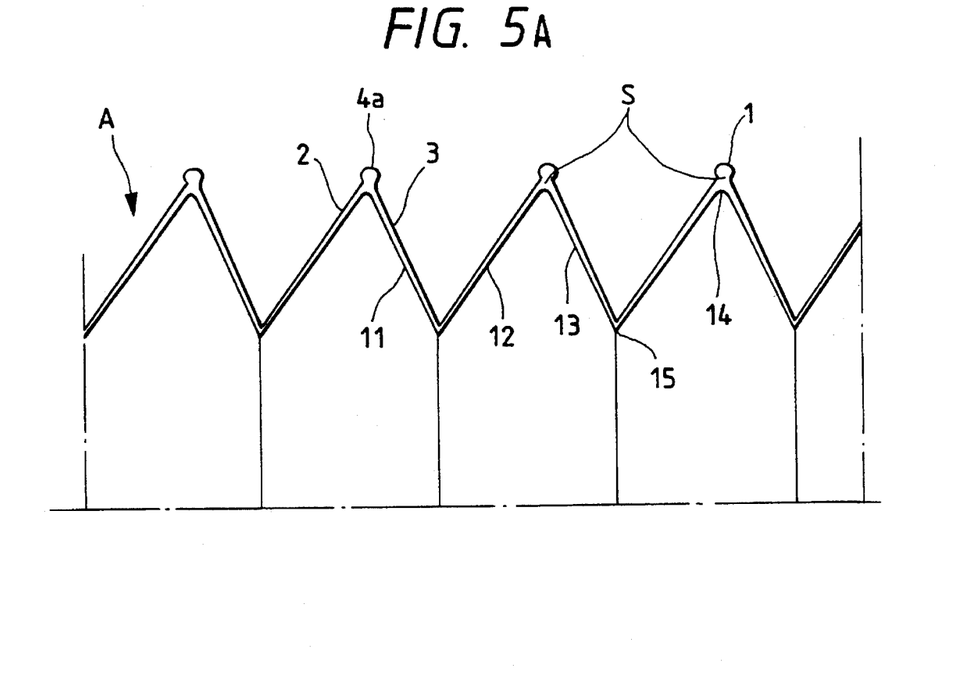
FIG. 5A is a sectional view of the extended posture of the pipe walls of a second embodiment.
Figure 5B:
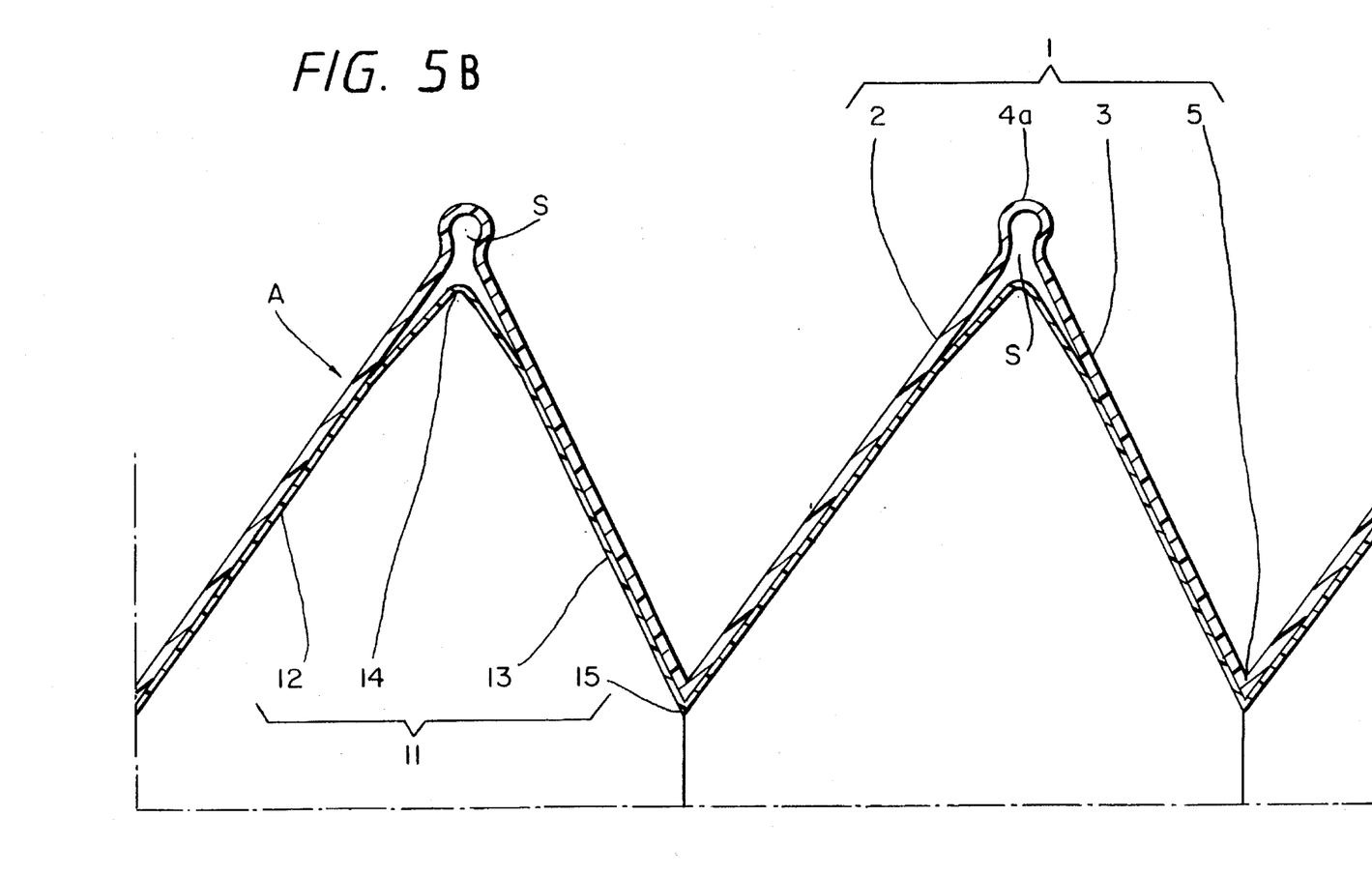
FIG. 5B is an enlarged view of a portion of the two pipe walls of FIG. 5A.
Figure 6:
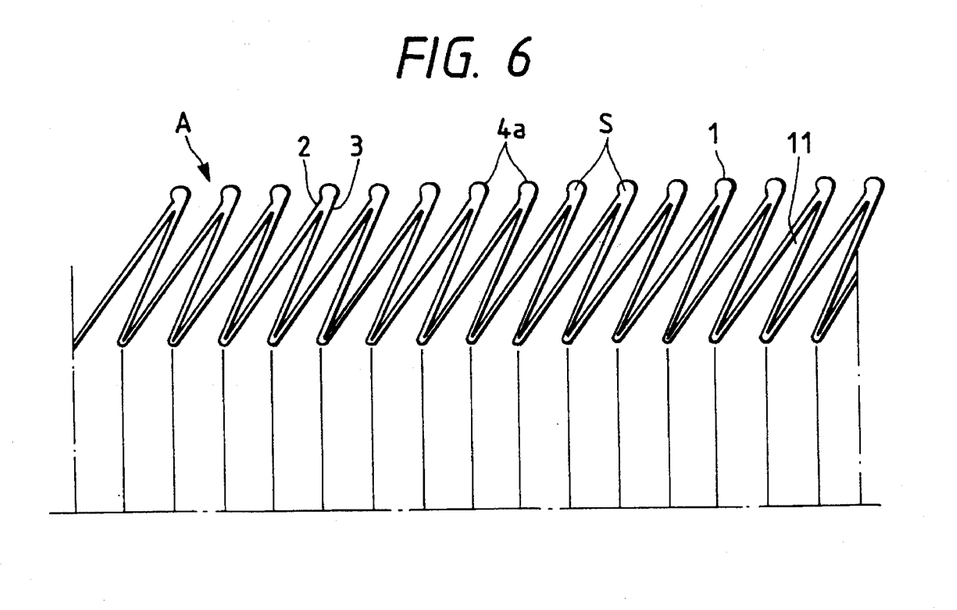
FIG. 6 is a sectional view of the shortened posture of the pipe walls of the second embodiment.

FIGS. 5A, 5B and 6 are views of a second embodiment corresponding to FIGS. 2A, 2B and 3 of the first embodiment described before. The section of pipe A of this second embodiment is composed in the following manner. Instead of the V-shape of the top portion 4 in the substantially triangular section of the pipe shown in the first embodiment, a small arc 4a is provided at the top portion. Due to this structure, the posture of the pipe A can be more easily changed between the extended and shortened postures, and at the same time, a distance in the circumferential direction of the space S (see especially FIG. 5B) between this arc portion 4a and the top portion 14 of the second pipe wall 11 can be maintained to be large, so that the second pipe wall 11 is not affected when the main pipe wall 1 has been damaged.

For the convenience of explanation, the embodiments of the present invention are described in the case where the pipe A is formed by the blow molding means. However, it should be noted that the present invention is not limited to the specific means, and a belt-shaped material may be used and wound spirally so that the edges are overlapped and adhered. In this way, a pipe having spiral corrugation can be provided.

Material used for composing the pipe walls 1 and 11 is not limited to polypropylene (PP) exemplified in the explanation of the embodiments of the present invention. Of course, it is possible to manufacture the pipe from other synthetic resin materials. For example, PE, EVA and PVC may be used, or alternatively the main pipe wall 1 may be made of PP material, and the second pipe wall 11 may be made of a mixed material in which 10 to 40 weight percent of EPT (rubber) is added to PP. In this way, material may be arbitrarily selected. In this connection, since the pipe walls 1 and 11 are changed between the extended and shortened postures, it is preferable to select a material which is less susceptible to the occurrence of cracks at the bending fulcrums. The pipe A described in the present invention is not limited to the drain pipe of an electric washing machine and the air blowing pipe of a futon drier, but the pipe A may be applied to all arbitrary pipes.

Typical embodiments of the present invention are explained above, however, it should be noted that the present invention is not limited to the specific embodiments. For example, the wall thickness of one inclined wall 2 may be different from the wall thickness of the other inclined wall 3. That is, variations, modifications and elimination of parts may be made therein within the scope that the structure described above is provided, the objects of the present invention can be attained, and the effects described below can be obtained.

As can be seen from the above explanations, the pipe of the present invention is made of synthetic resin, and the section of the pipe wall is formed to be substantially triangular, and one inclined wall moves and approaches the other inclined wall while the inclined wall goes over the center line passing through the top portion formed by the inclined walls adjacent to each other, and the approaching posture can be maintained by the pipe wall itself. The second pipe wall, the wall thickness of which is smaller than that of the aforementioned pipe wall, is integrally connected with the inside of the wall. Also, the section of the second pipe wall is formed to be substantially triangular, and the bottom and a predetermined length of the portions of the inclined walls at the bottom side of the second pipe wall are adhered to the bottom and the inclined walls of the aforementioned pipe wall, so that the space S is formed between the top portion of the second pipe wall and the top portion of the aforementioned pipe wall. When the outside pipe wall is damaged by abrasion or other accidents while it is used over a long period of time, the leak of fluid from the inside to the outside of the pipe can be stopped by the second pipe wall provided inside. Therefore, the pipe can be successively used without any problems. Since the space S is formed between the top portion of the outside pipe wall and the top portion of the second pipe wall, there is no possibility that the second pipe wall is damaged simultaneously with the outside pipe wall. Even if the outside pipe wall is damaged, the second pipe wall is still protected by the outside pipe wall. Therefore, it is possible that the pipe is used over a long period of time, and the durable length of time can be greatly enhanced.

Although the pipe of the present invention provides the aforementioned effects, the second pipe wall is thin, so that a large quantity of material is not required for manufacturing the pipe, and the increase of weight can be avoided. Further, when the pipe is stored or transported, the length of the pipe can be reduced to a half of the length of the extended posture or less. Therefore, the storage and transport expenses can be greatly reduced.

What is claimed is:

1. A synthetic resin bellows pipe, comprising:

a first pipe wall having a substantially triangular section and made of synthetic resin material, said first pipe wall including a first inclined wall and a second inclined wall adjoining to said first inclined wall and being slightly shorter in length than said first inclined wall, said second inclined wall being operative to approach said first inclined wall while said second inclined wall goes over a center line passing through a first top portion between said first and second inclined walls so as to assume a contracted posture, and the contracted posture in which said second inclined wall has approached said first inclined wall being capable of being maintained without any outer force; and a second pipe wall having a substantially triangular section which is smaller than that of said first pipe wall and being provided inside said first pipe wall, a wall thickness of said second pipe wall being smaller than that of said first pipe wall, a second bottom portion of said second pipe wall and parts of a third inclined wall and a fourth inclined wall forming said second pipe wall at a side of said second bottom portion being connected to a first bottom portion of said first pipe wall and parts of said first inclined wall and said second inclined wall at a side of said first bottom portion, said second pipe wall having a second top portion, one of said second top portion and said second top portion plus parts of the third and fourth inclined walls at a side of said second top portion are not connected to one of said first top portion of said first pipe wall and said first top portion plus parts of the first and second inclined walls at a side of said first top portion so as to form a non-contacted portion, such that said first and second pipe walls are separated from each other at said non-contacted portion thereby defining a space therebetween.

2. A synthetic resin bellows pipe as claimed in claim 1, wherein a first opening angle between said first inclined wall and said centerline is formed to be larger than a second opening angle between said second inclined wall and said center line.

3. A synthetic resin bellows pipe as claimed in claim 1, said first top portion of said first pipe wall is provided with an arc portion.

4. A synthetic resin bellows pipe as claimed in claim 1, the length of said parts of said third and fourth inclined walls is in a range from one half to nine tenths of that of said first and second inclined walls.

5. A synthetic resin bellows pipe as claimed in claim 1, wherein said first pipe wall comprises an integral tube with no seam which is formed by expanding a continuous melted resin tube of a first material, said second pipe wall comprises an integral tube with no seam which is formed by expanding a continuous melted resin tube of a second material, with a thickness smaller than the tube of said first pipe wall, and said second pipe wall is heat-fused to said first pipe wall.

* * * * *